United States Patent [19]

Sano

[11] Patent Number: 4,762,014
[45] Date of Patent: Aug. 9, 1988

[54] RACK-PINION MECHANISM IN STEERING DEVICE

[75] Inventor: Osamu Sano, Kashihara, Japan

[73] Assignee: Koyo Jidoki Kabushiki Kaisha, Nara, Japan

[21] Appl. No.: 728,317

[22] Filed: Apr. 29, 1985

[30] Foreign Application Priority Data

May 1, 1984 [JP] Japan ............................. 59-63025[U]

[51] Int. Cl.[4] .............................................. B62D 3/12
[52] U.S. Cl. ......................................... 74/422; 74/498
[58] Field of Search ................................. 74/422, 498

[56] References Cited

U.S. PATENT DOCUMENTS

| | | | |
|---|---|---|---|
| 4,215,591 | 8/1980 | Bishop | 74/422 |
| 4,224,833 | 9/1980 | Jablonsky | 74/498 |
| 4,322,986 | 4/1982 | Adams et al. | 74/422 |
| 4,448,088 | 5/1984 | Adams | 74/422 |

Primary Examiner—Allan D. Herrmann
Attorney, Agent, or Firm—Bruce L. Adams; Van C. Wilks

[57] ABSTRACT

Disclosed is a rack and pinion mechanism used in a steering device of a vehicle, in which when a pinion is engaged with rack teeth at an axially middle part of a rack bar, the rack bar is supported by supporting surfaces of a support yoke in the form of surface contact. When the pinion is engaged with the rack teeth at a part other than the axially middle part of the rack bar, on the contrary, the rack bar is supported by a rotary bearing mounted on the support yoke. Therefore, when a vehicle runs rectilinearly, the sliding resistance of the rack bar becomes large and the handle is stabilized, while when the vehicle turns, the sliding resistance becomes small and handling is made light because the rack bar is supported by a bearing.

12 Claims, 2 Drawing Sheets 4,762,014

RACK-PINION MECHANISM IN STEERING DEVICE

BACKGROUND OF THE INVENTION

The present invention relates to a steering device in a vehicle and particularly to a rack and pinion mechanism used in a steering device.

A rack and pinion mechanism is widely used in a steering device in which steering torque and rotating displacement produced by a steering handle are suitably converted and transmitted to steering wheels through a link mechanism to thereby turn the vehicle. The rack and pinion mechanism includes a pinion rotatively mounted in a housing, a rack constituted by a rack bar portion (hereinafter simply referred to as rack bar) arranged to be linearly movable through the housing and a rack teeth portion (hereinafter simply referred to as rack teeth) formed on the rack bar and operatively coupled with the pinion such that the rotation of the pinion effects linear movement of the rack bar, and a support yoke contacting slidably with the rack bar in the housing. The rack bar is slidably in contact with the support yoke with its under surface being made to be in face-to-face contact with the support yoke, so that the frictional force developed due to sliding contact between the rack bar and the support yoke causes considerable wear in the relevant contact surfaces and thus reduces transmitting efficiency of rack and the pinion mechanism. As the result, feeling of handling becomes deteriorated.

In U.S. Pat. No. 3,421,387 filed by Frederick John Adams and issued Jan. 14, 1969, it is proposed that a roller member such as a ball, a reel, a spool, or the like, is rotatably mounted in a housing and a rack bar is supported at its under surface by the roller member. In this arrangement, the sliding resistance or friction on the support surface of the rack bar in the housing decreases and light handle feeling may be obtained upon steering the handle. However, the transmitting efficiency increases too much in the entire range of handling and it becomes easy to suffer from the influence caused by kickback or vibrations in rectilinearly running of a vehicle, resulting in a disadvantage that the handle may freely rotate so as to deteriorate the handle feeling.

SUMMARY OF THE INVENTION

An object of the present invention is to provide a rack and pinion mechanism in which the sliding resistance or friction is increased when a pinion is engaged with rack teeth at an axially middle part of a rack bar, while it is reduced when the pinion is engaged with the rack teeth at a part of the rack bar extending from the axially middle part toward its left or right end.

According to an aspect of the present invention, the rack and pinion mechanism provided with a housing, a pinion rotatably mounted in the housing, a rack constituted by a rack bar arranged to be linearly movable through the housing and a plurality of rack teeth arranged axially on the rack bar so that rotation of the pinion effects linear movement of the rack bar, and a yoke member for elastically pressingly supporting the rack bar at its surface opposite to the rack teeth, is featured in that there are further provided a rotary supporting member arranged rotatably at a bottom center of the rack bar supporting surface of the yoke member, and an engaging/disengaging means arranged on the rack bar such that the rack does not abut on the rotary supporting member when the pinion is engaged with the rack teeth at an axially middle part of the rack bar, while when the pinion engages with the rack teeth at a part extending from the axially middle part of the rack bar, the rack bar is made to abut on the rotary supporting member.

In a preferred embodiment of the present invention, the engaging/disengaging means is constituted by a recess portion formed in the rack bar at its middle part and in its surface portion opposite to the rack teeth. Thus, when pinion is engaged with the rack teeth at an axially middle part of the rack bar, the rotary supporting means does not abut on the rack bar portion, but the rack bar is supported by the supporting surface of the yoke member, so that the sliding resistance or friction of the rack bar becomes large. When pinion is engaged with the rack teeth at the axially middle part of the rack bar, the handling is in a neutral position, that is, in a rectilinearly running state. Thus, the handle is prevented from freely rotating by kickback or vibrations. When the pinion is engaged with the rack teeth at a part of the rack bar other than or extending from the axially middle portion of the same, the recess portion is also positioned at left side or right side from the rotary supporting member so that the rack bar is supported by the rotary supporting member and the sliding resistance or friction becomes small. Consequently, upon steering the handle, the handling becomes light and the handling feeling is made good.

Other objects, features, and advantages of the present invention will be made apparent by the detailed description made here-after with respect various embodiments shown in the accompanied drawings.

DETAILED DESCRIPTION OF PREFERRED EMBODIMENTS

Figure 1:
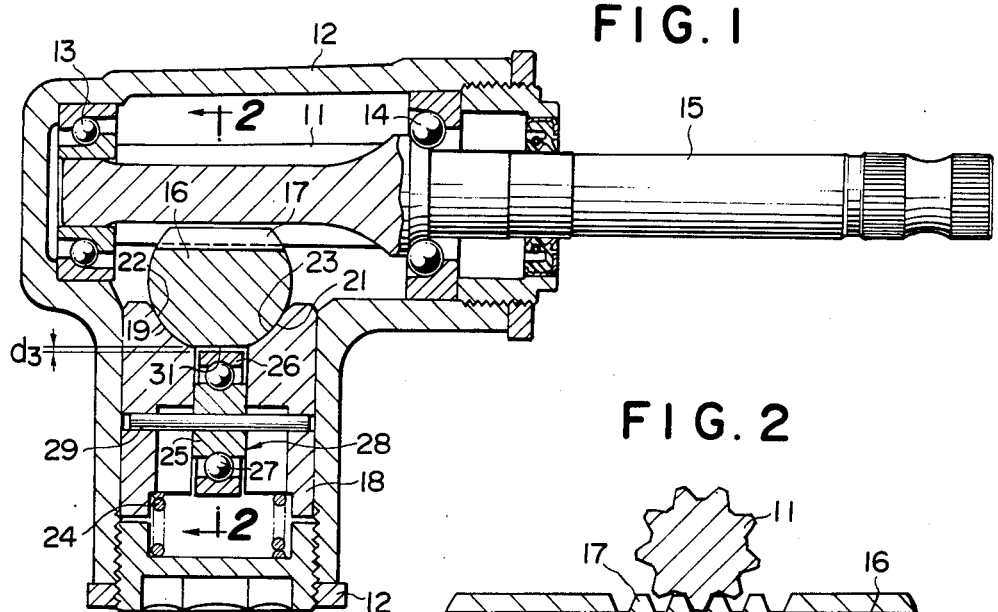
FIG. 1 is a cross-section taken normal to an axial direction of a rack bar in a first embodiment of a rack-pinion mechanism according to the present invention and shows the state in rectilinearly steering.

First, a first embodiment of the present invention shown in FIGS. 1 to 4 will be described. A pinion 11 is rotatably supported by bearings 13 and 14 in a housing 12. The pinion 11 is rotatively driven by a pinion shaft 15. The pinion 11 is engaged with rack teeth 17 of a rack bar 16 and the rack bar 16 slides linearly through the housing 12 upon rotation of the pinion 11. The rack bar 16 is in contact with and slidably supported by a support yoke 18 inserted in the housing upward movablly in FIG. 1.

On the upper surface of the support yoke 18, supporting side surfaces 22 and 23 are formed for supporting the rack bar 16 while contacting with both the lower side surfaces 19 and 21 of the rack bar 16. The support yoke 18 is in contact at its lower portion with one end of a coil spring 24 with its other end being in contact with a part provided within the housing 12. The support yoke 18 is always biased upwardly and elastically by the coil spring 24. A bearing 28 constituted by an inner wheel 25, an outer wheel 26, and a plurality of balls 27 rotatably inserted between the wheels 25 and 26, is attached to the support yoke 18. The opposite ends of a bearing shaft 29 fixed to the inner wheel 25 are mounted on the support yoke 18 such that the bearing shaft 29 extends in parallel with the axial direction of the pinion 11, and that the top end portion of the rotatable outer wheel 26 is projected by a height of $d_1$ from a line extending between the respective lower ends of the supporting side surfaces 22 and 23 of the support yoke 18, that is from the center of the bottom of the generally semicircularly formed supporting surface.

Figure 2:
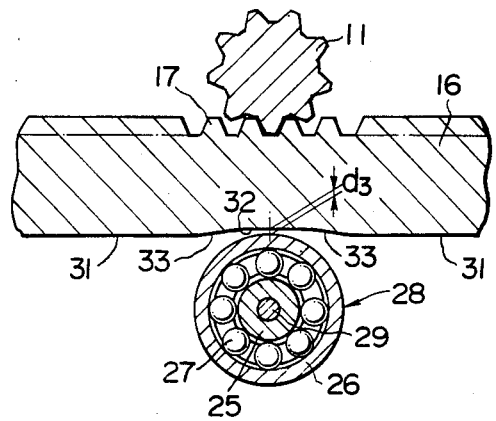
FIG. 2 is a side view taken on line 2—2 in FIG. 1.

Axially extending flat portions 31 are formed on the rack bar 16 on the side opposite to the rack teeth 17. As shown in FIG. 2, a recess portion 32 having a depth of $d_2$ which is slightly larger than the projecting height $d_1$ of the outer wheel 26 of the bearing 28, is formed in the rack bar 16 at its axially middle portion. The recess portion 32 is continued at its opposite ends to the respective adjacent flat portions 31 through slanting surfaces 33.

As shown in FIGS. 1 and 2, when the pinion 11 is engaged with the rack teeth 17 at an axially middle part of the rack bar 16, and therefore when a vehicle is in rectilinearly running, the outer wheel 26 of the bearing 28 is positioned under the recess portion 32 and is not engaged with the rack bar 16 because of a gap which is the difference $d_3$ between the depth $d_2$ of the recess portion 32 and the projecting height $d_1$ of the outer wheel 26. The side surfaces 19 and 21 are respectively supported by the supporting side surfaces 22 and 23 of the support yoke 18. Therefore, the sliding resistance of the rack bar 16 becomes large, so that stable feeling of the handle in rectilinearly running increases and the handle can be prevented from freely rotating due to kickback and vibrations.

Figure 3:
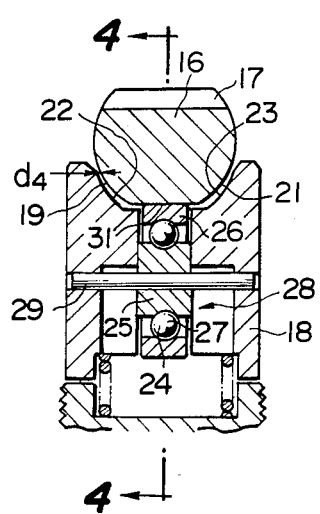
FIG. 3 is a cross-section similar to FIG. 1 and shows the state of the rack and pinion mechanism of FIG. 1 in curve steering.
Figure 4:
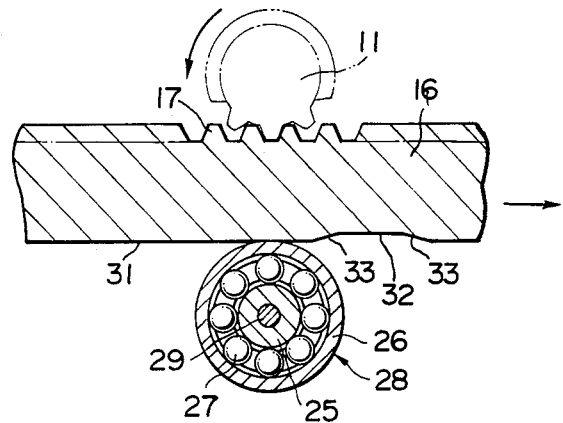
FIG. 4 is a side view taken on line 4—4 in FIG. 3.

FIGS. 3 and 4 illustrate the state upon leftward steering, in which the rack bar 16 moves rightward above a certain amount as indicated by an arrow in FIG. 4. The recess portion 32 also moves rightward above a certain amount because of the movement of the rack bar 16 and the outer wheel 26 of the bearing 28 abuts on the flat portion 31 of the rack bar 16. At that time, the support yoke 18 is located at a lowered position against the elastic force of the spring 24. Because the outer wheel 26 abuts on the flat portion 31, a gap $d_4$ is formed between the side surfaces 19 and 21 of the rack bar 16 and the corresponding side surfaces 22 and 23 of the support yoke 18. Therefore, when the vehicle is steered left, the rack bar 16 is supported by the bearing 28, so that the sliding or friction of the rack bar 16 becomes small. Therefore, the vehicle can be steered with light steering force, and light steering feeling can be obtained. Also when the vehicle is steered right, the same effect can be obtained.

Figure 5:
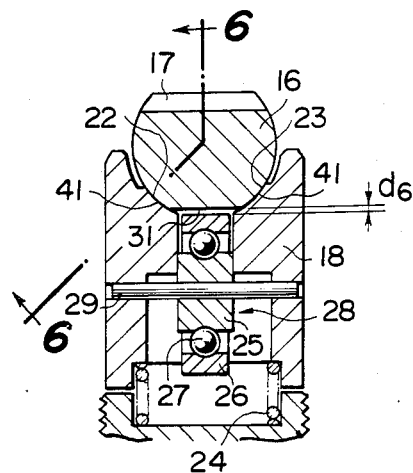
FIG. 5 is a cross-section taken normal to an axial direction of a rack bar in a second embodiment according to the present invention and shows the state in rectilinearly steering.
Figure 6:
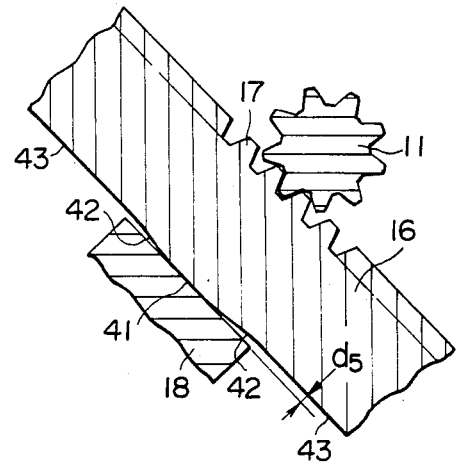
FIG. 6 is a cross-section taken on line 6—6 in FIG. 5 with a pinion.

FIGS. 5 to 8 illustrate a second embodiment according to the present invention, in which the same constituent elements as those in the first embodiment are designated by the same reference numerals and the detailed description thereabout will be omitted. In this embodiment, the lower side surfaces of the rack bar 16 which face the corresponding supporting side surfaces 22 and 23 of the support yoke 18, are formed in such a manner as follows. Namely, apparently projected cylindrical surfaces 41 are formed on the rack bar 16 at the both side surfaces of the rack bar at a portion where the pinion 11 is engaged with the rack teeth 17 at an axially middle part of the rack bar 16. By reducing the rack bar in thickness at the adjacent left and right sides each extending from the apparently projected cylindrical surfaces 41 reduced flat surfaces 43 each having a depth of $d_5$ is formed as seen in FIG. 6. Each of the apparently projected cylindrical surfaces 41 is continued at its opposite ends to the corresponding left and right reduced flat portions 43 through respective slanting surfaces 42. As shown in FIGS. 5 and 6, therefore, in rectilinearly running operation during which the pinion 11 is engaged with the rack teeth 17 at an axially middle part of the rack bar 16, the apparently projected cylindrical surfaces 41 abut on the corresponding supporting side surfaces 22 and 23 of the support yoke 18, so that the sliding resistance of the rack bar 16 becomes large. At that time, although lifting force acting on the rack bar 16 is caused by the apparently projected cylindrical surfaces 41, the rack bar 16 is vertically fixed so that the support yoke 18 is forced to come down against the elastic force of the spring 24 and a gap $d_6$ is formed between the flat surface 31 of the rack bar 16 and the outer wheel 26 of the bearing 28. Thus, the flat surface 31 of the rack bar 16 is never supported by the outer wheel 26.

Figure 7:
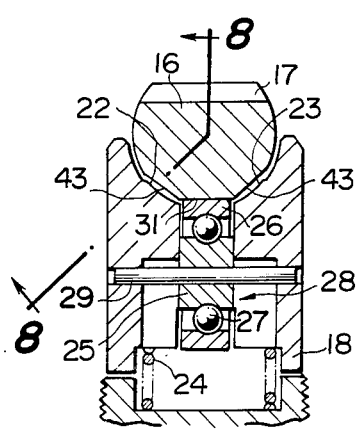
FIG. 7 is a cross-section similar to FIG. 5 and shows the state of the rack and pinion mechanism of FIG. 5 in curve steering.
Figure 8:
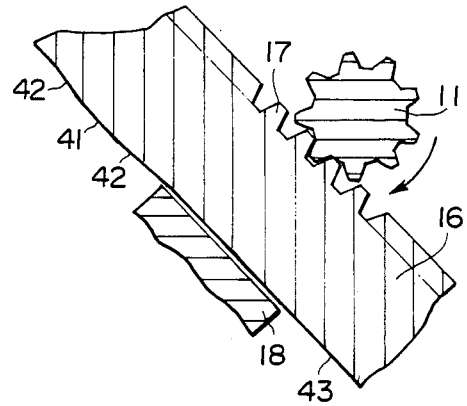
FIG. 8 is a cross-section taken on line 8—8 in FIG. 7.

As shown in FIGS. 7 and 8, when a vehicle turns right, abutment of the apparently projected cylindrical surfaces 41 of the rack bar 16 onto the corresponding supporting side surfaces 22 and 23 of the support yoke 18, is released and the reduced flat surfaces 43 face the corresponding supporting side surfaces 22 and 23. Although the rack bar 16 is apt to come down because of the reduced flat surfaces 43, the rack bar 16 is vertically fixed as described above, so that the support yoke 18 is pushed upward by the coil springs 24. Therefore, the flat surface 31 of the rack bar 16 abuts on the outer wheel 26 of the bearing 28 and at the same time gaps are formed between the reduced flat surfaces 43 on the both side surfaces of the rack bar 16 and the corresponding supporting side surfaces 22 and 23 of the support yoke 18. Thus, the rack bar 16 is supported by the bearing 28 and the handle operation becomes light.

The specific embodiments according to the present invention have been illustrated and described, however, it is apparent for those skilled in the art that various modifications in shape or as to a small part can be made without departing from the subject and the scope of the present invention.

What is claimed is:

1. A rack and pinion mechanism comprising: a housing, a pinion rotatably mounted in said housing, a rack constituted by a rack bar arranged to be linearly movable through said housing and a plurality of rack teeth arranged axially on said rack bar and engaged with said pinion so that rotation of said pinion effects linear movement of said rack bar, a yoke member for elastically pressingly supporting said rack bar at a surface thereof opposite to said rack teeth, a rotary supporting member rotatably arranged at a bottom center of a surface of said yoke member which supports said rack bar, and engaging/disengaging means arranged on said rack bar and comprising an axially middle part and an axially adjacent part extending axially from the axially middle part, the axially middle part being axially movable to contact with the yoke member but not to contact with the rotary supporting member when the amount of the linear movement of the rack bar is below a certain value, and the axially adjacent part being axially movable to contact with the rotary supporting member when the amount of the linear movement of the rack bar is above the certain value, whereby said axially middle part does not make contact with said rotary supporting member during engagement of said pinion with said rack teeth of said axially middle part.

2. A rack and pinion mechanism according to claim 1, in which said axially middle part is provided on a bottom surface of said rack bar opposite to the rack teeth and is constituted by a recess portion having a depth not to abut on said rotary supporting member.

3. A rack and pinion mechanism according to claim 2, in which the recess portion includes slanting surfaces adjacent to the axially adjacent part.

4. A rack and pinion mechanism according to claim 1, in which said axially adjacent part includes a bottom surface of the rack bar opposite to the rack teeth and flatly reduced portions provided on side surfaces of said rack bar between the rack teeth and the bottom surface whereby the bottom surface contacts with the rotary supporting member.

5. A rack and pinion mechanism according to claim 4, in which said reduced portion includes a slanting surface adjacent to the axially middle part.

6. A rack and pinion mechanism comprising:
a housing;
a pinion rotatably mounted in the housing;
a rack bar linearly movable in the housing and having rack teeth therealong engaged with the pinion so that rotational movement of the pinion effects linear displacement of the rack bar;
a yoke member disposed in the housing opposite to the pinion and in slidable contact with a surface of the rack bar for maintaining the engagement of the pinion and the rack teeth by biasing the rack bar against the pinion, the yoke member slidably supporting the rack bar with a relatively large friction therebetween;
a rotary supporting member rotatably mounted in the yoke member to make occasional slidable contact with the surface of the rack bar for slidably supporting the rack bar with a relatively small friction therebetween; and
engaging/disengaging means provided on the surface of the rack bar and movable relative to the yoke member and rotary supporting member according to the linear displacement of the rack bar, the engaging/disengaging means comprising an axially middle part and an axially adjacent part extending axially from the axially middle part, the axially middle part being movable to contact with the yoke member but not to contact with the rotary supporting member when the linear displacement of the rack bar is below a certain amount, and the axially adjacent part being movable to contact with the rotary supporting member when the linear displacement of the rack bar is above the certain amount, whereby said axially middle part does not make contact with said rotary supporting member during engagement of said pinion with said rack teeth of said axially middle part.

7. A rack and pinion mechanism according to claim 6; wherein the engaging/disengaging means further comprises a slanting portion extending between the axially middle part and the axially adjacent part.

8. A rack and pinion mechanism according to claim 6; wherein the rack bar comprises an axially extending bottom surface opposite to the rack teeth, and a pair of axially extending side surfaces between the axially extending bottom surface and the rack teeth.

9. A rack and pinion mechanism according to claim 8; wherein the yoke member comprises a pair of bearing surfaces each in sliding contact with respective ones of the axially extending side surfaces.

10. A rack and pinion mechanism according to claim 9; wherein the rotary supporting member is disposed between the pair of bearing surfaces to make occasional contact with the axially extending bottom surface.

11. A rack and pinion mechanism according to claim 10; wherein the axially middle part comprises a recess portion provided on the axially extending bottom surface and located within a range defined by the certain amount of the linear displacement of the rack bar.

12. A rack and pinion mechanism according to claim 10; wherein the axially adjacent part comprises a pair of flatly reduced portions each provided on respective ones of the axially extending side surfaces and located out of a range defined by the certain amount of the linear displacement of the rack bar.

* * * * *